No. 679,071. Patented July 23, 1901.
J. GARNIER.
COCK.
(Application filed Apr. 18, 1901.)
(No Model.)
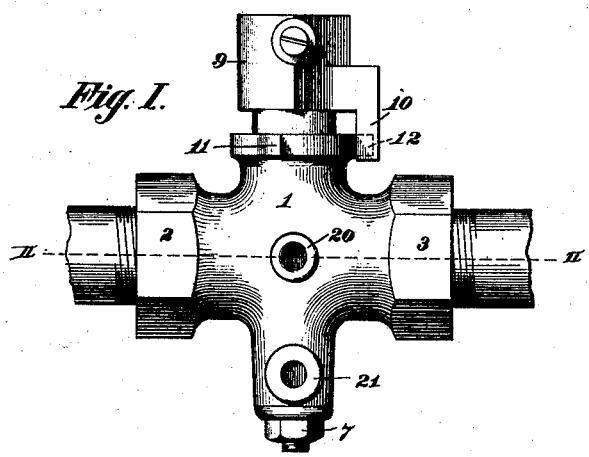
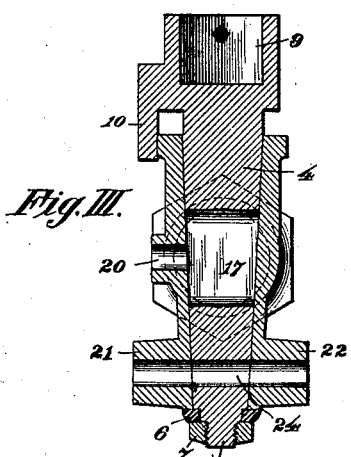
Witnesses
H. S. Austin
Karl _____
Inventor:
Joe Garnier
By _____
Attorney.
THE NORRIS PETERS CO., PHOTO-LITHO., WASHINGTON, D. C.

UNITED STATES PATENT OFFICE.

JOE GARNIER, OF CHATTANOOGA, TENNESSEE.

COCK.

SPECIFICATION forming part of Letters Patent No. 679,071, dated July 23, 1901.

Application filed April 18, 1901. Serial No. 56,396. (No model.)

*To all whom it may concern:*

Be it known that I, JOE GARNIER, of Chattanooga, in the county of Hamilton, State of Tennessee, have invented certain new and useful Improvements in Cocks, of which the following is a complete specification, reference being had to the accompanying drawings.

The object of my invention is to produce improvements in stop and waste cocks whereby in one device provision is made for closing and draining independent systems supplied from a common main, and especially for draining both the hot and cold water systems of buildings.

My device is intended in application to make it possible by the operation of a single cock to guard against freezing by shutting off the main supply and draining the pipes of both the hot and cold water systems that are connected with the main through the cock. The employment of a drain-cock for the prevention of freezing is a common expedient; but heretofore it has been necessary to provide one means for draining the cold-water system and another for draining the hot-water system. My cock is adapted to accomplish the two purposes through a single operation.

In the accompanying drawings, Figure I is a side elevation of my cock, showing its pipe connections. Fig. II is a longitudinal section on the line II II of Fig. I, showing in full lines the mainway of the cock open and in dotted lines the same closed for drainage purposes. Fig. III is a transverse section of the subject-matter of Fig. I, showing the plug in its draining position.

Referring to the numerals on the drawings, 1 indicates the barrel of the shell of my cock, which is provided on one side with an inlet-pipe connection 2 and on the other side with an outlet-pipe connection 3. The barrel accommodates a preferably tapered plug 4, which, extending through it, is provided at one end with a reduced threaded end 5, adapted to accommodate a washer 6 and a nut 7, by which the plug is secured in place. At its opposite extremity the plug is provided with means for operating it—for example, a squared key-head 9. Upon one side the head is preferably provided with a dependent finger 10, which works between stop-lugs 11 and 12, formed on the neck of the barrel. The lugs are located so that the rotary movement of the plug is limited to a quarter-turn.

An inner wall 14, separating the pipe connections 2 and 3 from each other, is pierced by diametrically opposite apertures 15 and 16, (see Fig. II,) with which the mainway 17 of the plug is adapted to register, as shown in full lines in Fig. II, or which are adapted to be closed by shifting the position of the plug to the position shown in dotted lines in said figure. The wall of the plug opposite the mainway 17 is penetrated by a duct 18, which when the plug is turned to close the mainway, as shown in dotted lines in Fig. II of the drawings, affords a means of drainage with the pipe connection 3, the mainway in that position of the plug being in communication with a drainage-aperture 20, formed in one side of the barrel.

The above-specified barrel, plug, and means of drainage from the mainway are presented as a preferred means of draining the water system connected with the pipe connection 3, which in practice would ordinarily be the cold-water system of a building. This connection, however, will not suffice to drain the hot-water system, although it derives its cold-water supply from the same connection 3. To drain the hot-water system, I provide an additional drainage connection with the barrel and its plug, and for that purpose prefer to employ in the barrel 1 diametrically opposite nipples 21 and 22. With one of the nipples—for example, the nipple 22—a drainage-pipe connection is established with the hot-water system of a building. This being purely a drainage connection, is kept closed by the plug 4 so long as the plug is in the position shown in full lines in Fig. II; but when the plug is turned to the position shown in dotted lines in Fig. II it establishes drainage connection between the nipples 21 and 22, as shown in Fig. III, as through a diametrical aperture 24, formed in the plug and adapted to register with the bores of the nipples 21 and 22 when the plug is turned to perform its drainage function—that is to say, when the plug is in the position illustrated in Fig. III.

In operation all that is necessary in order to afford complete drainage is to make a quarter-turn of the plug from the position shown in full lines in Fig. II to that illustrated in Fig. III, when the water will simultaneously drain from both the hot and cold water systems through the aperture 20 and the nipple 21. The aperture 20 and the nipple 21 may drain into the open or may be connected with drainage-tubes, as preferred.

What I claim is—

1. In a combination stop and waste cock, the combination with a barrel, its pipe connections, a plug, mainway and drainage connections, of separate drainage connections in the barrel and plug.

2. In a combination stop and waste cock, the combination with a barrel, its pipe connections, a plug, mainway and drainage connections, of separate drainage connections in the barrel and plug, and means for limiting the movement of the plug, for fixing its position for making and breaking its drainage connections.

In testimony of all which I have hereunto subscribed my name.

JOE GARNIER.

Witnesses:
A. R. DANNEBERG,
A. A. KUNZ.